March 23, 1943.　　　D. G. C. LUCK　　　2,314,795
RADIO RANGE
Filed May 5, 1939　　　3 Sheets-Sheet 1
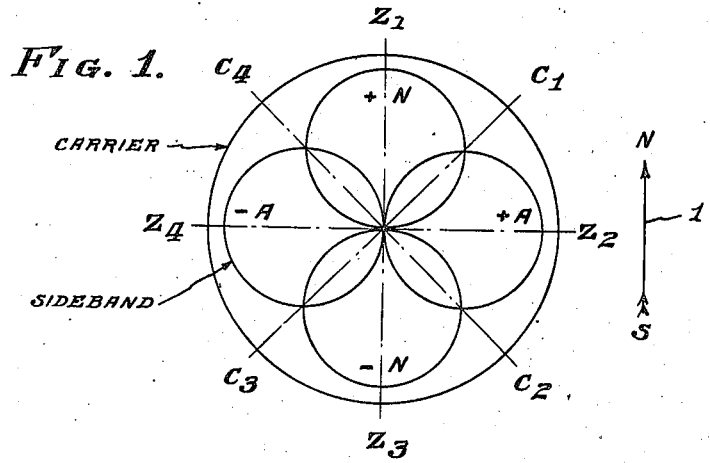
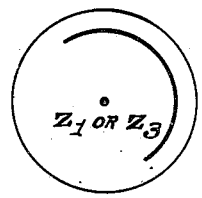 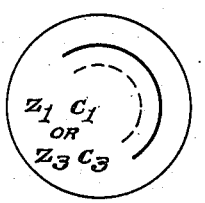 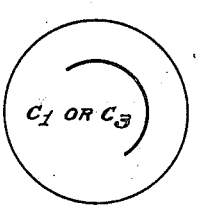 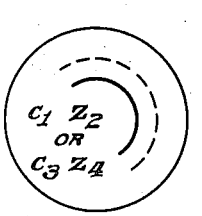
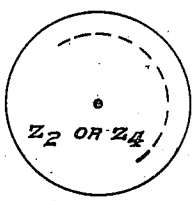 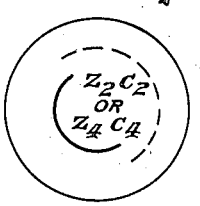 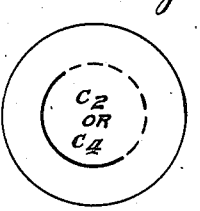 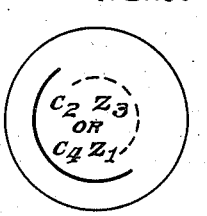
Inventor
David G. C. Luck March 23, 1943.  D. G. C. LUCK  2,314,795
RADIO RANGE
Filed May 5, 1939  3 Sheets-Sheet 2

Inventor
David G. C. Luck
By
Attorney

March 23, 1943.   D. G. C. LUCK   2,314,795
RADIO RANGE
Filed May 5, 1939   3 Sheets-Sheet 3
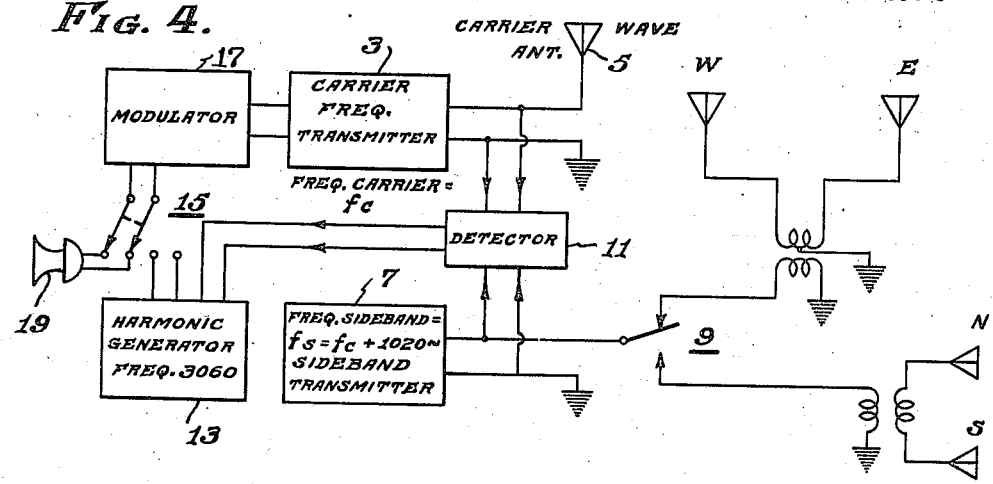
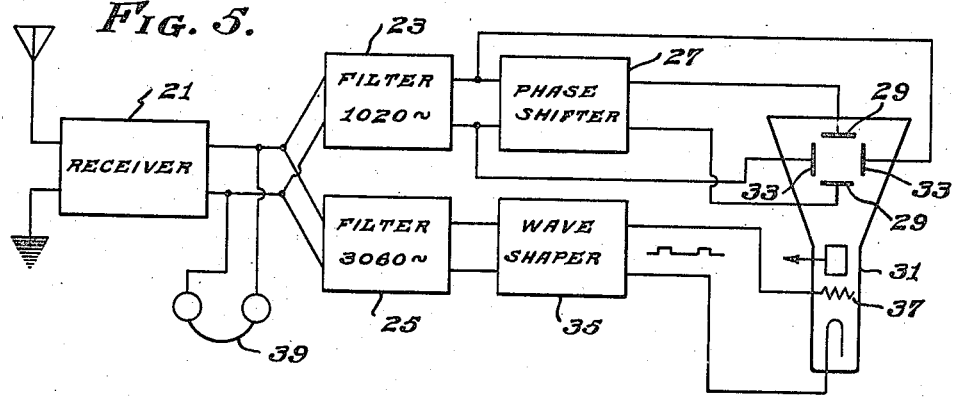
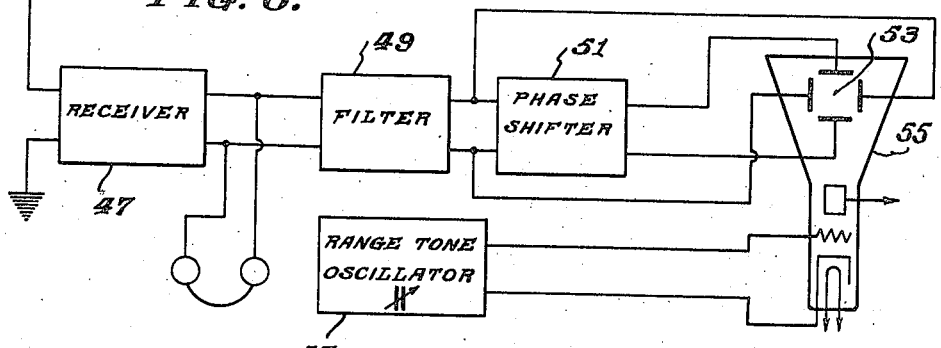
Inventor
David G. C. Luck
By
Attorney Patented Mar. 23, 1943

2,314,795

UNITED STATES PATENT OFFICE 2,314,795

RADIO RANGE

David G. C. Luck, Haddon Heights, N. J., assignor to Radio Corporation of America, a corporation of Delaware Application May 5, 1939, Serial No. 272,017

7 Claims. (Cl. 250—11)

This invention relates to radio ranges and more especially to means for identifying the courses and quadrants of a four-course radio range.

Radio ranges are transmitting systems which provide means for establishing partially overlapping directional fields. In the overlapping region, equal signal strengths designate a desired course. In ranges of the aural type, complementary telegraphic signals are generally used. If A (- —) and N (— -) are used, the combined signals form a single long dash which indicates the desired course.

As long as the pilot of an aircraft is following the radio range signals and knows on which course he is flying, there is no ambiguity. If the pilot becomes lost, although he can hear the range signals, it is only with great difficulty that he can determine in which quadrant of the range he is flying. While it is possible to supplement the range with a radio direction finder or to follow a rather elaborate orientation procedure to determine the unknown quadrant, it would be preferable to employ an identifying system.

While quadrant identification means have been proposed, the necessary devices are cumbersome and the system involves complicated circuits, and may require auxiliary transmitting channels. It is therefore one of the objects of the invention to provide a simple means of quadrant identification for equi-signal radio ranges. It is a further object of the invention to provide means supplementing the aural radio range signals for providing visual quadrant identifying signals. An additional object is to provide an indicator which will show simultaneously the radio course and its identity.

Figure 2A:
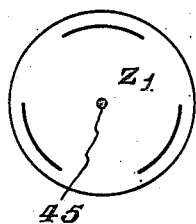
Figure 2B:
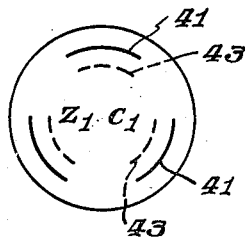
Figure 2C:
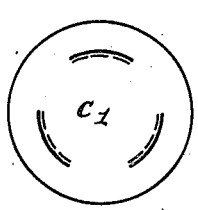
Figure 2D:
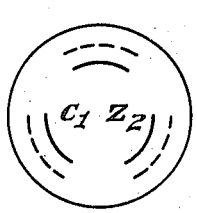
Figure 2E:
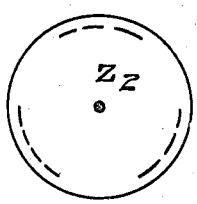
Figure 2F:
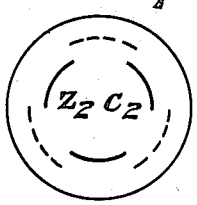
Figure 2G:
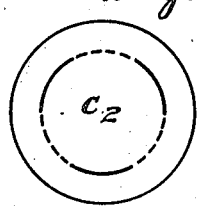
Figure 2H:
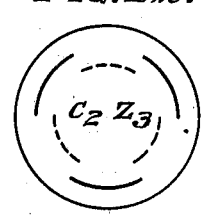
Figure 2I:
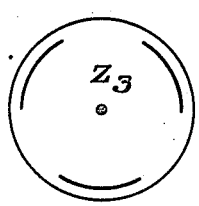
Figure 2J:
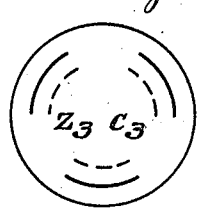
Figure 2K:
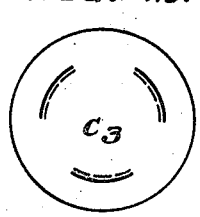
Figure 2L:
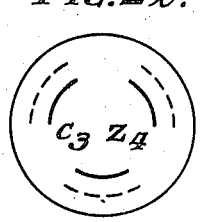
Figure 2M:
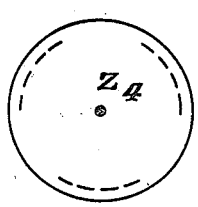
Figure 2N:
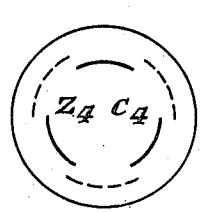
Figure 2O:
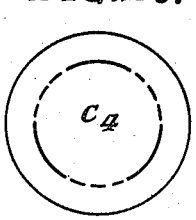
Figure 2P:
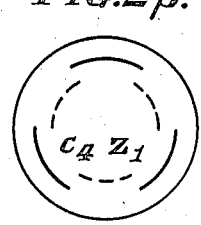

The invention will be described by reference to the accompanying drawings in which Figure 1 is a schematic diagram of radio range courses; Figures 2a to 2p represent indications for identifying radio range courses; Figures 3a to 3h represent identifying and course indications; Figure 4 is a schematic diagram of the circuits of a radio range transmitter embodying the invention; Figure 5 is a schematic circuit diagram of a receiver employing the invention; and Figure 6 is a circuit diagram of a modification of the invention.

Referring to Fig. 1, the side-band field patterns of a radio range are identified as two figures-of-8 with overlapping portions. One of the figures-of-8 is identified as +N—N, the other figure-of-8 is identified as +A—A. Lines of equal modulation depth in the overlapping portions are shown as $C_1$, $C_2$, $C_3$, and $C_4$. The regions in which one of the radiated patterns has zero intensity are represented as $Z_1$, $Z_3$ and $Z_2$, $Z_4$. For the sake of a reference point the +N sector has been positioned to correspond to due north, as indicated by the arrow 1. At the instant when the modulation phase on one N quadrant is plus, that in the opposite N quadrant is minus. Likewise, when one A quadrant is plus, the other A quadrant is minus. This characteristic phase of the patterns makes possible a definite identification of all courses by transmitting a reference phase. This may be done by applying a sub-carrier in the frequency region normally used for speech. The sub-carrier is modulated in proper phase by the range tone or modulation frequency. If the signals are properly demodulated by a radio receiver, a reference tone of proper phase may be derived and applied to one winding of a dynamometer having the other winding energized by tone currents corresponding to the radio range modulation. The dynamometer pointer will then deflect to the right if the reference tone and the range tone are of similar phase; the indication will be to the left if they have opposite phase. The meter indications may be correlated with the AN keying epochs by listening to the signals and by watching the meter deflections. The entire method may be made purely aural, as hereinafter described.

Referring to Fig. 4, the schematic arrangement of the latest type of radio range includes a carrier frequency transmitter 3 which is coupled to a nondirective antenna 5. A sideband frequency transmitter 7 is connected alternately through a link circuit relay 9 to the north-south (N, S) antennas and to the east-west (E, W) antennas. The link circuit relay is arranged to apply complementary Morse telegraphic A's to one antenna array and N's to the other antenna array. The antennas are arranged so that their radiation fields correspond to Fig. 1. If the sideband transmitter 7 and the carrier transmitter 3 are coupled to a detector 11, the demodulated output of the detector will include a current having a frequency equal to the difference of the carrier and sideband frequencies and definitely related in phase to the modulation frequency of the directional fields which by virtue of the carrier and sideband frequencies may be said to be modulated. In the present ranges, this frequency is 1020 cycles per second. The detector may be energized by a radiation pickup placed suitably in the radiation fields instead of being connected directly.

The currents of modulation frequency are applied to a harmonic generator 13, which, by way of example, provides currents of three times the modulation frequency. These currents are applied through the double pole-double throw switch 15 to the modulator 17. The modulator 17 is connected to the carrier frequency generator. The modulator 17 may be connected to a microphone 19 for speech transmission.

In a system of the foregoing type, the oscillators are operated continuously, and, since the modulation is produced by the heating of the oscillators, the modulation bears a definite relation to the radio frequency phase difference, i. e., the phase of the modulation is reversed when the initial phase difference between the carrier and sideband waves is changed by 180°. Such 180° change of sideband phase occurs between lobes of each figure-of-8 pattern. Furthermore, the harmonic frequency is transmitted as a reference phase by applying harmonic modulation to the carrier.

The receiver for the radio range transmitter just described is shown schematically in Fig. 5. The receiver 21 is connected to a first 23 and a second filter 25. The first filter passes the modulation frequency currents which are applied to a phase shifter 27. The phase shifter shifts the phase of the applied currents 90°. The phase shifter output is connected to two of the deflecting elements 29, of a cathode ray tube 31. The filter output 23 is connected to the other deflecting elements 33. The filter 25 for the third harmonic currents of reference phase is connected to a wave-shaping circuit 35 which converts the applied sine wave currents to currents of square wave form. These converted currents are applied to the control electrode 37 of the cathode ray tube.

The operation of the receiver is as follows: The radio receiver responds to the combined carrier and sideband currents, the latter being keyed by conventional complementary Morse signals, for example, A—M by operation of the link circuit relay. The Morse signals have a modulation frequency corresponding to the difference frequency of the carrier and side bands. The demodulated carrier may be heard in the telephone receivers 39. The signals corresponding to the difference frequency, after filtering, are applied to the deflecting elements in quadrature phase. The cathode ray is thereby rotated synchronously with the modulation frequency. At the same time, the harmonic frequency currents are applied synchronously to the control grid to bias the ray.

The resultant cathode ray trace is difficult to illustrate because it changes in the keying rhythm and therefore may be observed as dots and dashes similar to blinker light telegraph signalling or the operator may observe the flashes and listen to the signals. For purposes of illustration, the solid arcs 41 represent an N or dash dot and the broken arms 43 represent an A or dot dash (see Fig. 2b). If the receiver is on the $Z_1$ or $Z_3$ courses, no A signals will be received. Therefore, the cathode ray will form a small spot 45 and the N signals will appear as shown in Figs. 2a and 2i. If the receiver is on the $Z_2$ or $Z_4$ courses (as shown in Figs. 2e and 2m), the A signals will appear and the small spot represents the absence of N signals. The four patterns, being different, represent and identify four courses on which +N, —N, +A or —A only are received. Thus four additional or single signal courses are established by a normally four course range.

The patterns corresponding to the four normal or equi-signal courses $C_1$, $C_2$, $C_3$, $C_4$ are shown in Figs. 2c, 2g, 2k, 2o, respectively. The on-course signals are of equal strength and, therefore, the radius of the solid arc and the broken arc, representing respectively N and A, coincide. As in the case of the off-course patterns, the present on-course patterns identify the several separate courses.

The conditions for the boundary between the off-course quadrants and the on-course lines are represented by cathode ray patterns corresponding to 2b, 2d, 2f, 2h, 2j, 2l, 2n, 2p. In these patterns, the radii of the solid arc or the radii of the broken arc are greater, respectively, as the N or the A signal predominates. Furthermore, the foregoing eight patterns are all different and are identified with the sectors between the single signal courses and their adjacent equi-signal courses; for example, with the constants $Z_1C_1$, $C_1Z_2$, $Z_2C_2$, etc.

The foregoing system requires a modification of the existing radio ranges of the so-called simultaneous type. If the present ranges are used without modification, some identification may be had but the cathode ray pattern will not be stationary and 180° ambiguity will be present. Although the system with 180° ambiguity is not preferred, it has the advantage of simplicity. For example, as shown in Fig. 6, the receiver includes a conventional amplifier, detector and signal amplifier 47. The signals are filtered 49 and applied in quadrature phase by connecting a suitably arranged phase shifter 51 to the deflecting elements 53 of a cathode ray tube 55. The grid of the cathode ray tube is keyed by a local oscillator 57, which preferably generates currents of square wave form and the frequency of the range modulation. The several patterns are shown in Figs. 3a to 3h. The symbols are similar to those previously used in Figs. 2a to 2p. In the present case the lack of synchronism permits the patterns to rotate and the 180° ambiguities are indicated.

The foregoing receivers employ cathode ray tubes and the cathode ray patterns serve to indicate not only on-course or off-course but also to identify the quadrants and courses. Some pilots may prefer aural signals, which may be used in connection with either the meter or cathode ray indicator. It is also practical to make the method purely aural by a manual switch, which adds the reference tone algebraically to the range tone in a suitably biased vacuum tube amplifier. The observer will find an increase or decrease of sound depending upon the relative phases of the two tones; that is, either the A or the N will predominate as a function of the reference phase.

Thus, the invention has been described as a system or method of identifying the quadrants and courses of a radio range. In one form, a local oscillator supplies a reference tone which is either applied to the telephone receivers, a meter or a cathode ray tube to indicate the phase of the range signals. In the preferred form, a reference phase or tone is transmitted from the range and applied to indicate visually the course or quadrant in which the receiver is operated.

I claim as my invention:

1. A radio range including means for establishing alternately directive overlapping radio fields of sideband frequency, a transmitter for radiating nondirectively a carrier frequency field, means for deriving from the output of said transmitter a phase reference tone of a frequency different from said sideband frequency, and a modulator for applying said tone to said transmitter.

2. A radio range including a source of sideband radio frequency energy, a source of carrier frequency energy, means for combining portions of said energies to derive a current corresponding to a function of said two frequencies but differing in frequency from either of said two frequencies and from their difference frequency, and means for applying said derived current to said carrier energy to modulate said carrier to include said derived current of differing frequency.

3. A radio range including a source of sideband radio frequency energy, a source of carrier frequency energy, a detector, means for applying said energies to said detector to derive a current of a frequency corresponding to the difference of said sideband and carrier frequencies, means for obtaining a current at a harmonic of said difference frequency, and means for modulating said carrier energy with said harmonic frequency current.

4. A radio range system including a source of sideband frequency energy, a source of carrier frequency energy, means for combining portions of said energies and for deriving a current corresponding to a harmonic of the difference between said sideband and carrier frequencies, means for applying said harmonic current to said carrier to produce additional sidebands, a receiver responsive to said carrier and sideband energies, and means for indicating the phase of said sidebands by reference to said harmonic.

5. A radio range system including a source of sideband frequency energy, a source of carrier frequency energy, means for radiating said sideband energy in directive and overlapping fields in which the phases of the components corresponding to the difference between the sideband frequency and the carrier frequency identify the fields and overlapping portions, means for combining portions of said energies to derive a current corresponding to a harmonic of the difference between said sideband and carrier frequencies, means for applying said harmonic current to said carrier to produce additional sidebands, a receiver responsive to said carrier and sideband energies, and means for indicating the phase of said sidebands by reference to said harmonic.

6. A radio range system including a source of sideband frequency energy, a source of carrier frequency energy, means for combining portions of said energies and for deriving a current corresponding to a harmonic of the difference between said sideband and carrier frequencies, means for applying said harmonic current to said carrier to produce additional sidebands, a receiver responsive to said carrier and sideband energies, and a cathode ray tube indicator connected to said receiver and controlled by said harmonic and difference frequency for identifying the several fields by distinctive patterns.

7. A radio range system including a source of sideband frequency energy, a source of carrier frequency energy, means for radiating said carrier frequency energy in all directions, means for radiating said sideband energy in directive and overlapping fields in which the phases of the components corresponding to the difference between the sideband frequency and the carrier frequency identify the fields and overlapping portions, means for combining portions of said energies and for deriving a current corresponding to a harmonic of the difference between said sideband and carrier frequencies, means for applying said harmonic current to said carrier to produce additional sidebands, a receiver responsive to said carrier and sideband energies, and a cathode ray tube indicator connected to said receiver and controlled by said harmonic and difference frequency for identifying the several fields by distinctive patterns.

DAVID G. C. LUCK.